(12) United States Patent
Tanaka et al.

(10) Patent No.: US 9,525,318 B2
(45) Date of Patent: Dec. 20, 2016

(54) VEHICULAR AC GENERATOR

(71) Applicants: Kazunori Tanaka, Tokyo (JP);
Toshiyuki Oonishi, Tokyo (JP); Kyoko Higashino, Tokyo (JP)

(72) Inventors: Kazunori Tanaka, Tokyo (JP);
Toshiyuki Oonishi, Tokyo (JP); Kyoko Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 300 days.

(21) Appl. No.: 13/633,102

(22) Filed: Oct. 1, 2012

(65) Prior Publication Data

US 2013/0257231 A1 Oct. 3, 2013

(30) Foreign Application Priority Data

Mar. 27, 2012 (JP) ................................. 2012-070927

(51) Int. Cl.
| | |
|---|---|
| *H02K 11/04* | (2016.01) |
| *H02K 5/24* | (2006.01) |
| *H02K 5/14* | (2006.01) |
| *F16B 5/02* | (2006.01) |

(52) U.S. Cl.
CPC ............... *H02K 5/24* (2013.01); *H02K 5/141* (2013.01); *F16B 5/025* (2013.01); *F16B 5/0241* (2013.01)

(58) Field of Classification Search
CPC .......... H02K 5/24; H02K 5/141; H02K 5/225; H02K 11/046; H02K 19/365
USPC ................................................ 310/68 R, 71
See application file for complete search history.

(56) References Cited

U.S. PATENT DOCUMENTS

| | | | | |
|---|---|---|---|---|
| 3,586,892 A | * | 6/1971 | Sato ..................... | H02K 11/046 310/239 |
| 4,604,538 A | * | 8/1986 | Merrill ................. | H02K 11/046 310/68 D |
| 5,268,605 A | * | 12/1993 | Bradfield ............... | H02K 5/141 310/239 |
| 5,686,780 A | * | 11/1997 | Adachi et al. ............. | 310/68 D |

(Continued)

FOREIGN PATENT DOCUMENTS

| | | |
|---|---|---|
| FR | 2936913 A1 | 4/2010 |
| JP | 09-074727 A | 3/1997 |

(Continued)

OTHER PUBLICATIONS

JP 09074727 A machine translation Oct. 15, 2014.*
Communication dated Oct. 14, 2015 from the French Patent Office in counterpart application No. 1261330, 8 pages.

*Primary Examiner* — Joshua Benitez-Rosario
*Assistant Examiner* — Leda Pham
(74) *Attorney, Agent, or Firm* — Sughrue Mion, PLLC; Richard C. Turner

(57) ABSTRACT

Adverse effects of a large assembling step comparable to tolerance of stacking members among constituent parts are prevented. At least two components and, among a voltage regulator, a brush holder and a rectifier, that are fastened with each other are provided with both component-fixing portions and fastening-together portions and for fastening the components together with each other, and an assembling step absorbing portion is provided at least at the fastening-together portion that is not close to the component-fixing portions of the respective components.

8 Claims, 4 Drawing Sheets

(56) References Cited

U.S. PATENT DOCUMENTS

| | | | | |
|---|---|---|---|---|
| 7,492,068 B2* | 2/2009 | Mizuta | .................. | H02K 5/225 |
| | | | | 310/68 D |
| 2006/0138882 A1* | 6/2006 | Sakakibara | ................ | 310/68 D |

FOREIGN PATENT DOCUMENTS

| | | | | |
|---|---|---|---|---|
| JP | 09074727 | A | * | 3/1997 |
| JP | 2003-235215 | A | | 8/2003 |

* cited by examiner

VEHICULAR AC GENERATOR

BACKGROUND OF THE INVENTION

Field of the Invention

The present invention relates to vehicular AC generators mounted on vehicles and the like.

Description of the Related Art

Patent Document 1 describes, as an example of a conventional vehicular AC generator, a configuration of a brush holder including a positive brush, a negative brush, a casing, a positive terminal and a negative terminal, in which the negative terminal connected to the negative brush is fastened together with a housing frame at a regulator-case-fixing hole portion, directly or with a metal pipe press-fitted or insert-molded in the portion; meanwhile the positive terminal is connected and fixed to a regulator control terminal.

On the other hand, Patent Document 2 describes that in a rectifier that is another component similarly fixed to a projecting boss of a frame (bracket), if the entire rectifier is supported only by part of a negative-side cooling fin and the projecting boss of the frame, the fin undergoes excessive stress due to vehicle vibration, causing such problems as the fin deforming and the longevity of mounted rectifying elements shortening; therefore, as a countermeasure against this problem is shown a configuration in which all stacking members including the negative-side cooling fin are fastened together with the frame, so as to relieve a burden imposed on the fin. In addition, it is described that in a stacking construction such as this, a large assembling step is created that is comparable to accumulated tolerance of the rectifier made up of the stacking members including a terminal base, a positive-side cooling fin and an insulating spacer. Furthermore, it is also described that if the problem with the assembling step as described above is left unsolved, there arises another problem in that diodes are likely to undergo excessive stress due to distortion caused in the fin close to a directly fixing portion during assembly to fix, and their longevity would be thereby shortened, and in order to solve this problem, a low-rigid portion is provided close to the directly fixing portion.

Patent Document 1: Japanese Patent No. 3812822
Patent Document 2: Japanese Patent No. 3543876

Patent document 2 describes a problem attributed to a large assembling step created in components provided with both fastening-together portions and component-fixing portions, and this problem is known to arise in other components such as conventional brush holders, so it is difficult to eliminate the large assembling step itself comparable to the tolerance of the stacking members. Incidentally, "the large assembling step comparable to tolerance of the stacking members" described in this description is as follows: for example, when all stacking components are dimensionally at their respective upper limits or at lower limits within allowable tolerance of the respective components to be assembled, the limits accumulate, which could lead to the stacking members exceeding an allowable range. This is expressed as "the large step."

As to locations (terminals) at which the brush holder is fixed to other components or the frame, in Patent Document 1, not all of the locations are arranged on the same plane perpendicular to the rotation shat, and on one plane, a location is moved outwardly farther than the outer peripheral end of the brush holder case. By configuring as described above, vibration in the rotation axis direction due to rotation of the rotor under high-vibration conditions should be prevented. However, since the foregoing step is created when the brush holder is assembled, in fact, not so small distortion is imposed on the terminal portion extending relatively long. In the worst case, the extending portion may break off at the base, so that there has been a fear of insulation being not assured.

Moreover, since the low-rigid portion is provided close to the fixing portion in Patent Document 2, there have been problems with destabilizing factors, such as components wobbling when they are fixed, mechanical strength and so forth.

SUMMARY OF THE INVENTION

The present invention has been made to solve the foregoing problems, and aims at providing a vehicular AC generator, in which an assembling step absorbing portion is provided at a fastening-together portion that is not close to component-fixing portions of constituent parts including the brush holder, so that not only a configuration that excels in preventing vibration of the constituent parts in the rotation axis direction of the rotor is provided, but also adverse effects from the large assembling step comparable to the tolerance of stacking members among the constituent parts are not produced.

A vehicular AC generator according to the present invention comprises a rotor rotatably supported in a casing; a stator having a stator core and a stator winding wound around the stator core, supported by the casing surrounding the rotor; a rectifier disposed outside the casing in one axial side thereof, for rectifying an AC voltage generated in the stator winding; a voltage regulator disposed outside the casing in one axial side thereof, for regulating the magnitude of the AC voltage generated in the stator; a pair of slip rings for supplying a current to the rotor; a pair of brushes for sliding on their respective surfaces of the slip rings; and a brush holder for housing those brushes; wherein at least two components, among components including the rectifier, the voltage regulator and the brush holder, that are fastened with each other are provided with both component-fixing portions and fastening-together portions at which the components are fastened together with each other, and an assembling step absorbing portion is provided at a fastening-together portion, of at least one of the components, that is not close to the component-fixing portions of the respective components.

According a vehicular AC generator of the present invention, vibration of the constituent parts in the rotation axis direction of the rotor can be prevented and adverse effects from the large assembling step comparable to the tolerance of stacking members among the constituent parts are not produced.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
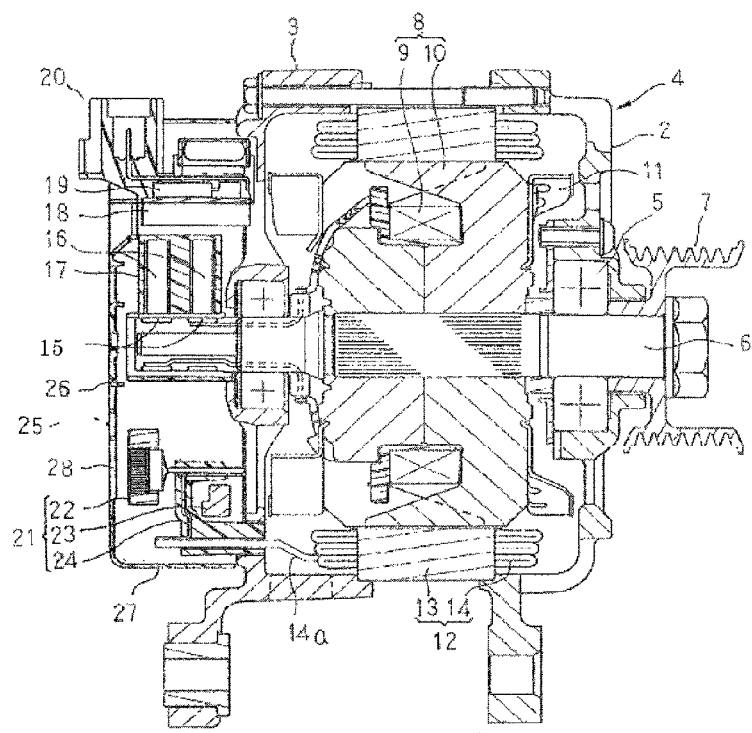
FIG. 1 is a side cross-sectional view showing a vehicular AC generator according to Embodiments 1 and 2 of the present invention.

Hereinafter, preferred embodiments related to a vehicular AC generator according to the present invention will be explained in detail referring to the accompanying drawings. Incidentally, the same reference numerals in each drawing represent the same or corresponding parts.
Embodiment 1

Figure 2:
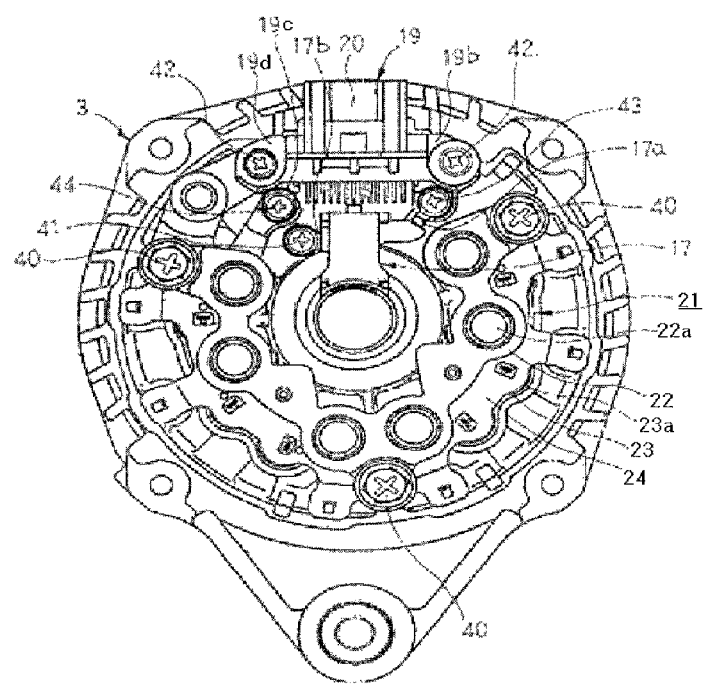
FIG. 2 is a rear view for explaining a state of a voltage regulator, brush holder and rectifier being fixed in the vehicular AC generator according to Embodiments 1 and 2 of the invention.

FIG. 1 is a side cross-sectional view showing a vehicular AC generator according to Embodiment 1 of the present invention; FIG. 2 is a rear view, with a cover removed, for explaining a mounting state of a voltage regulator, a brush holder and a rectifier of the AC generator according to Embodiment 1 of the invention.

In FIG. 1 and FIG. 2, the vehicular AC generator 1 includes a casing 4 having a front bracket 2 and rear bracket 3 each made of aluminum and formed in a near-bowl shape; a shaft 6 rotatably supported by this casing 4 via a pair of bearings 5; a pulley 7 fixed to the end of the shaft 6 extending outwardly in the front side of the casing 4; a rotor 8 fixed to the shaft 6 and disposed inside the casing 4; fans 11 fixed to both axial end faces of the rotor 8; and a stator 12 fixed to the casing 4 as surrounding the rotor 8.

Furthermore, the AC generator includes a pair of slip rings 15 that is fixed to an extending portion of the shaft 6 extending outwardly in the rear side of the casing 4 and supplies a current to the rotor 8; a pair of brushes 16 that slides on their respective surfaces of the slip rings 15; a brush holder 17 for housing these brushes 16; a voltage regulator 19 that is fixed to a heat sink 18 disposed radially outside the brush holder 17 and regulates the magnitude of an AC voltage generated in the stator 12; a connector 20 that is formed integrated with a fixing portion of the heat sink 18 and through which signals are transferred between the voltage regulator 19 and the like and external equipment (not shown); a rectifier 21 that is disposed in the rear side of the rear bracket 3 and rectifies the AC voltage generated in the stator 12 into a DC voltage; and a protective cover 25 mounted on the rear bracket 3 as covering the brush holder 17, the voltage regulator 19 and the rectifier 21.

The rotor 8 is a Landell-type rotor, which includes a field winding 9 that produces magnetic flux with an exciting current flowing therethrough and a pole core 10 that is disposed as covering the field winding 9 and forms magnetic poles by the magnetic flux. In addition, the stator 12 includes a cylindrical stator core 13 and a stator winding 14 that is wound around the stator core 13 and generates the AC voltage with the magnetic flux from the field winding 9 changed in accordance with rotation of the rotor 8. The stator 12 is disposed as surrounding the rotor 8 with the stator core 13 sandwiched axially between open ends of the front bracket 2 and rear bracket 3.

The rectifier 21 includes a positive-side heat sink 22 on which a plurality of positive-side rectifying elements 22a are mounted, a negative-side heat sink 23 on which a plurality of negative-side rectifying elements 23a are mounted and a circuit board 24, and those are stacked with the circuit board 24 sandwiched between the positive-side heat sink 22 and negative-side heat sink 23, and formed in a near C-shape viewed in the axis direction. Moreover, the positive-side rectifying elements 22a and negative-side rectifying elements 23a are connected with each other via the circuit board 24 so as to build a predetermined bridge circuit.

The rectifier 21 configured as described above is arranged outside the circumference of the slip rings 15, as formed in a fan shape with its center on the shaft 6, on a plane perpendicular to the axis line of the shaft 6, and fastened by screws 40 onto the outside end face of the rear bracket 3. Then, lead wires 14a of the stator winding 14 are led out of the rear bracket 3 and connected to terminals of the circuit board 24, whereby the rectifier 21 and the stator winding 14 are electrically connected with each other. Moreover, the brush holder 17 is disposed between the tips of the near-C-shaped rectifier 21 and fastened by a screw 41 to the outside end face of the rear bracket 3. Similarly, the voltage regulator 19 is disposed between tips of the near-C-shaped rectifier 21 radially outside the brush holder 17 and fastened by screws 42 to the outside end face of the rear bracket 3.

Next, a mutual assembling state of each component fastened to the rear bracket will be explained referring to FIG. 2 to FIG. 5. Incidentally, to make explanation simple, the voltage regulator 19, the brush holder 17 and the circuit board 24 will be renamed a first component (voltage regulator 19), a second component (brush holder 17) and a third component (circuit board 24) and then explained.

Figure 3:
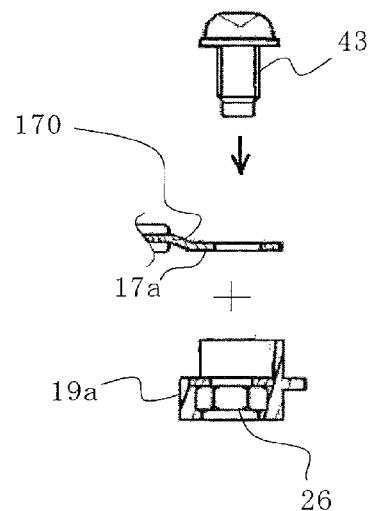
FIG. 3 is a view for explaining a stacking state at a location at which a first component (voltage regulator) and second component (brush holder) according to Embodiment 1 of the invention are fastened together with each other.
Figure 4:
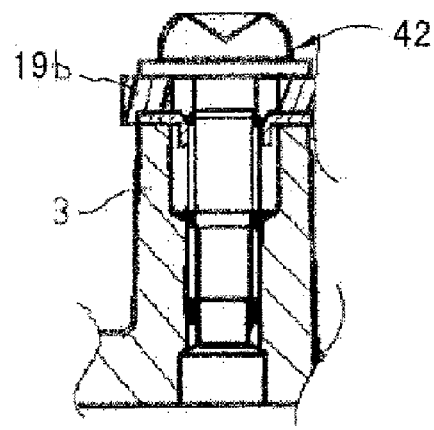
FIG. 4 is a cross-sectional view of a component-fixing portion of the first component according to Embodiment 1 of the invention.
Figure 5:
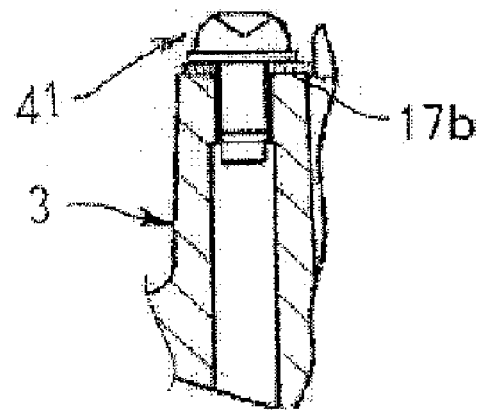
FIG. 5 is a cross-sectional view of a component-fixing portion of the second component according to Embodiment 1 of the invention.

At the fastening-together location in FIG. 3 shown as Embodiment 1, a fastening-together portion 19a of the first component 19 and fastening-together portion 17a of the second component 17 are superposed on each other and fastened together by a screw 43. The screw 43 is engaged with a nut 26 provided at the fastening-together portion 19a of the first component. The first component 19 itself is fixed to the rear bracket 3 at two locations, a component-fixing portion 19b of the first component (see FIG. 4) and another component-fixing portion 19d of the first component (see FIG. 2), and the second component 17 itself is directly fixed to the rear bracket 3 at one location, that is, a component-fixing portion 17b of the second component (see FIG. 5).

The distance between the component-fixing portion 17b of the second component and fastening-together portion 17a of the second component is longer than that between the component-fixing portion 19b of the first component and fastening-together portion 19a of the first component (see FIG. 2, distance between the screws 41 and 43 is longer than that between the screws 42 and 43). A bend-like section 170, which is a bent section, is provided close to a screw hole of the fastening-together portion 17a of this second component.

In assembling each component, the first component 19 is fixed by the screws 42 to the rear bracket 3 at the component-fixing portion 19b of the first component, the second component 17 is fixed by the screw 41 to the rear bracket 3 at the component-fixing portion 17b of the second component, and following that, the fastening-together portion 19a of the first component and fastening-together portion 17a of the second component that have been superposed on each other are fastened together.

According to a vehicular AC generator of Embodiment 1 as configured above, since the bend-like section 170 is provided at the portion that functions to prevent vibration in the rotation axis direction, the vibration does not affect the screw hole portion and component main body, and vibration and the like transmitted from the vehicle can be absorbed, so that a highly reliable vibration proof can be obtained.

Moreover, even if large stacking tolerance of the components occurs in the axis direction, the bend-like section 170 provided close to the tip of the fastening-together portion 17a of the second component functions to nearly bow, and effects of the tolerance are not transferred to the body side of each component, so that the assembling step due to the tolerance of stacking components can be easily absorbed. Moreover, since the low-rigid portion is not provided close to the fixing portion, destabilizing factors such as wobbling during fixing the components will not be added.

Embodiment 2

As Embodiment 2 of the present invention, fastening-together portions of the third component (circuit board) and first component (voltage regulator) will be explained referring to FIG. 2, FIG. 6 and FIG. 7. Embodiment 2 differs from Embodiment 1 in that a component-fixing portion of the third component (circuit board 24) is not directly fixed but fixed together with other additionally-stacked components (see FIG. 7). The third component 24 is fixed to the rear bracket 3 by the screws 40 via the negative-side heat sink 23.

Figure 6:
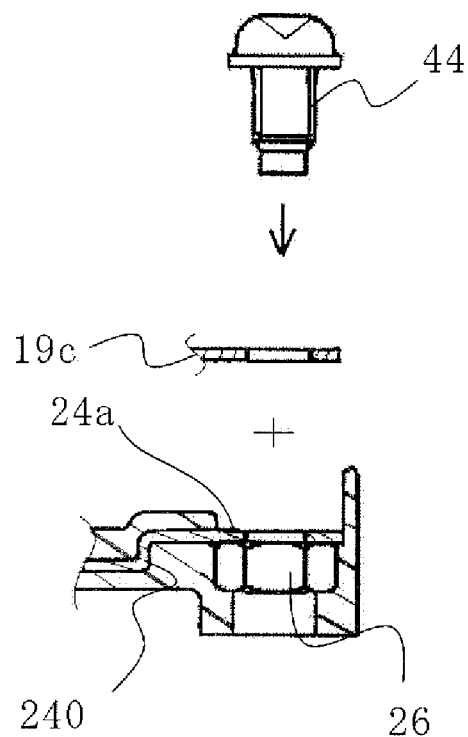
FIG. 6 is a view for explaining a stacking state at a location at which a first component (voltage regulator) and third component (circuit board) according to Embodiment 2 of the invention are fastened together with each other.
Figure 7:
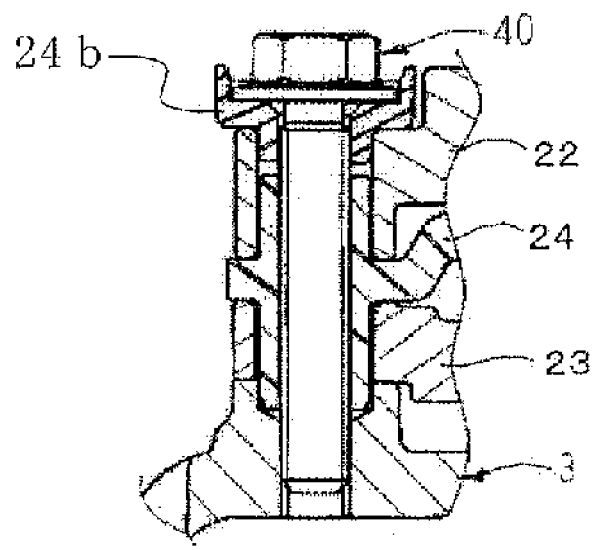
FIG. 7 is a cross-sectional view of a component-fixing portion of the third component according to Embodiment 2 of the invention.

At the fastening-together location shown in FIG. 6, a fastening-together portion 24a of the third component and fastening-together portion 19c of the first component are superposed on each other and fastened together by the screw 44. The screw 44 is engaged with the nut 26 provided at the fastening-together portion 24a of the third component. The third component itself is fixed by the screws 40 to the rear bracket 3 at three locations including the third component component-fixing portion 24b (see FIG. 7). The distance between the component-fixing portion 24b of the third component and fastening-together portion 24a of the third component is longer than that between the closer component-fixing portion 19b of the first component and fastening-together portion 19c of the first component (see FIG. 2, distance between the screws 40 and 44 is longer than that between the screws 42 and 44). A bend-like section 240, which is a bent section, is provided close to the fastening-together portion 24a of this third component.

In assembling each component, the third component 24 is fixed by the screws 40 to the rear bracket 3 at fixing locations including the component-fixing portion 24b of the third component, the first component 19 is fixed by the screws 42 to the rear bracket 3 at the component-fixing portion 19b of the first component, and following that, the fastening-together portion 24a of the third component and fastening-together portion 19c of the first component that have been superposed on each other are fastened together.

In this Embodiment as configured above, even if large stacking tolerance of the components occurs in the axis direction, the bend-like section 240 provided close to the tip of the fastening-together portion 24a of the third component functions to nearly bow, so that effects of the tolerance is not transferred to the body side of each component. Therefore, the same effects as those in Embodiment 1 can be produced. Since the low-rigid portion is not provided close to any fixing portion, destabilizing factors such as wobbling during fixing the components are not added.

Incidentally, an example has been explained in above-described Embodiments 1 and 2, in which any fastening-together portions do not double as fixing portions to other components (rear bracket 3 in the foregoing embodiment) at locations at which the above components are fastened together with each other; however, the same effects can be produced even by configuring the fastening-together portions to double as the component-fixing portions by changing the shape of components, adding intermediary parts, or the like. In doing so, the nuts provided at the fastening-together portion 19a of the first component and fastening-together portion 24a of the third component in the foregoing embodiment will be eliminated.

Moreover, the assembling step absorbing portion is provided on the brush holder 17, which is the second component, and the circuit board 24, which is the third component; however this is not limited to those components, but there may be a variety of cases, such as the absorbing portion is provided only on the voltage regulator, which is the first component, depending on configurations of components to be fixed to the rear bracket 3.

Furthermore in the embodiments described above, the bend-like section is in both cases provided on terminals as the assembling step absorbing portion; however when forming the bend-like section is not easy from a component configuration point of view, it is also effective to make the terminal width of the fastening-together portions narrower than that of the component-fixing portions. Partially changing the plate thickness of integrated components has definitely needed extra work such as cutting and pressing; however since only the plate width is changed, a die for forming the insertion parts, for example, has only to be modified, and process-by-process work in production is not needed, so that the assembling step absorbing portion can be configured without spending unnecessary cost in vain.

Figure 8:
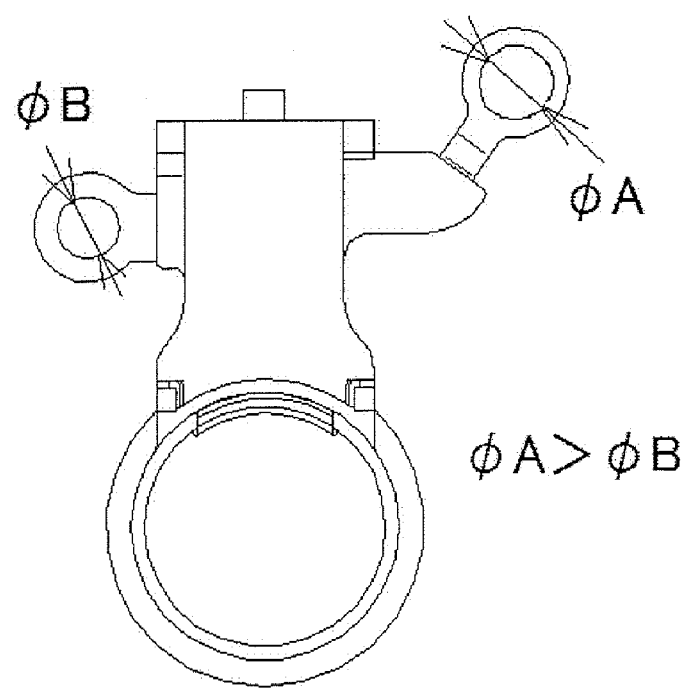
FIG. 8 is a top view of another example of a second component according to Embodiment of the invention.

Moreover in this Embodiment, a screw through-hole of the fastening-together portion 17a of the second component (brush holder 17) and that of the component-fixing portion 17b of the second component are shaped the same in the figure; however as shown in FIG. 8, a hole size ΦA in the fastening-together portion 17a side can be made larger than a necessary size ΦB. By doing so, not only component-stacking tolerance (in axis direction) but also backlash in positioning (perpendicular to the axis) can be absorbed, so that productivity is enhanced.

Various modifications and alterations of this invention will be apparent to those skilled in the art without departing from the scope and spirit of this invention, and it should be understood that this is not limited to the illustrative embodiments set forth herein.

What is claimed is:

1. A vehicular AC generator, comprising:
a casing including a bracket;
a rotor rotatably supported in the casing;
a stator having a stator core and a stator winding wound around the stator core, supported by the casing as surrounding the rotor;
a rectifier disposed outside the casing in one axial side thereof, for rectifying an AC voltage generated in the stator winding;
a voltage regulator disposed outside the casing in one axial side thereof, for regulating the magnitude of the AC voltage generated in the stator;
a pair of slip rings for supplying a current to the rotor;
a pair of brushes for sliding on their respective surfaces of the slip rings; and
a brush holder for housing those brushes;

wherein at least a first component and a second component, among the rectifier, the voltage regulator and the brush holder, are fastened with each other and provided with both component-fixing portions at which the first and second components themselves are fixed to the bracket at a first fixing location and a second fixing location, respectively, that are different from one another, as seen in a rear view orthogonal to an axial direction, of the AC generator, and fastening-together portions at which the first and second components are fastened together with each other at a fastening location which is different from the first and second fixing locations, as seen in the rear view, an assembling step absorbing portion is provided at a respective fastening-together portion of the first component, and a distance between the fastening location and the first fixing location of the first component is longer than that between the fastening location and the second fixing location of the second component, as seen in the rear view.

2. A vehicular AC generator according to claim 1, wherein the assembling step absorbing portion includes a bent section formed in a terminal of the respective fastening-together portion of the first component.

3. A vehicular AC generator according to claim 1, wherein the assembling step absorbing portion is provided adjacent to a position of a screw hole of the respective fastening-together portion of the first component.

4. A vehicular AC generator according to claim 1, wherein the assembling step absorbing portion is configured by making a width of a terminal provided at the respective fastening-together portion of the first component narrower than a width of a terminal provided at a respective component-fixing portion, of the first component.

5. A vehicular AC generator according to claim 1, wherein a screw through-hole of a terminal of the respective fastening-together portion of the first component is larger than a screw through-hole of a terminal of the respective component-fixing portion of the first component.

6. A vehicular AC generator according to claim 1, wherein the respective fastening-together portion of the first component has a straight portion including a screw hole through which the first component is fastened to the second component, and the assembling step absorbing portion includes a bent portion which extends from the straight portion.

7. A vehicular AC generator according to claim 1, wherein the distance between the fastening location and the first fixing location of the first component is at least twice as long as that between the fastening location and the second fixing location of the second component, as seen in the rear view.

8. A vehicular AC generator according to claim 1, wherein the fastening location and the second fixing location of the second component are disposed next to one another, as seen in the rear view.

* * * * *